United States Patent [19]

Drouillard

[11] 4,126,290

[45] Nov. 21, 1978

[54] RADIO ANTENNA BRACKET

[76] Inventor: Gordon E. Drouillard, 205 Lesperance Rd., Windsor, Ontario, Canada, N8N 1W2

[21] Appl. No.: 807,334

[22] Filed: Jun. 16, 1977

[51] Int. Cl.[2] .................... F16M 13/00

[52] U.S. Cl. .................... 248/226.1; 248/539

[58] Field of Search .................... 248/534, 539, 316 A, 248/226.1; 24/263 PJ, 263 WS, 263 A, 263 SB; 343/715, 720, 880, 882, 883

[56] References Cited

U.S. PATENT DOCUMENTS

| | | | |
|---|---|---|---|
| 3,056,570 | 10/1962 | Slavin | 248/539 |
| 3,071,338 | 1/1963 | Kavfman et al. | 248/539 |
| 3,315,932 | 4/1967 | Chandler | 248/226.1 |
| 3,756,568 | 9/1973 | Mocny | 248/226.1 X |
| 4,003,540 | 1/1977 | Hawkes | 248/539 |

*Primary Examiner*—J. Franklin Foss
*Attorney, Agent, or Firm*—Charles Krassov

[57] ABSTRACT

This invention is a bracket for supporting a truck cab radio antenna. Its main characteristic is its simple, rapid, and easy attachability and detachability to and from the outside rear-view mirror bracket. It consists of a tube of about the same height as a standard truck rear-view mirror bracket. A short rod is inserted and rigidly held within the top of the tube. A similar but somewhat longer rod is inserted into the bottom of the tube, wherein it is free to slide. Attached to the top insert is a top plate extending on both sides of the tube. At one end, this plate is provided with a central hole for the attachment of the antenna; while rigidly attached to the other end of this plate is a semicircular holder which fits over the top of the mirror bracket. A plate and similar holder is attached to the bottom of the sliding rod to fit under the bottom of the mirror bracket. A spring contained in the tube joins both inserts, and holds tightly the antenna bracket to the rear-view mirror bracket.

1 Claim, 3 Drawing Figures

RADIO ANTENNA BRACKET

This invention relates generally to brackets for supporting radio antennas on mobile objects, and particularly to antenna brackets used on truck cabs in connection with regular or C. B. radios located within the cabs.

Radios are used in cars and trucks for entertainment and information. Recently, with the introduction of C. B. radios for popular use, it has become an essential adjunct to the operation of the truck, particularly on long distance hauls, as a means of supplying or receiving information to and from the truck companies, and for communication between truck operators and themselves, and highway patrols, for the prevention of and during emergencies. Although, the radio itself is located within the cab, and is, upon the locking of the cab door, safe from being tampered with, the antenna being on the outside of the cab, is quite often stolen when the operator is absent from the truck, even for brief periods of time.

This invention provides a means for quickly disconnecting and reconnecting the radio antenna from and to the bracket which holds the outside rear view mirror of a truck, to which it is normally attached. Thus, when the driver of the truck leaves the truck, he can quickly remove the antenna and take it with him wherever he goes. Similarly, when he comes back to the truck, he can quickly attach it again. The attachment and removal of the antenna does not require the use of any tools.

Figure 1:
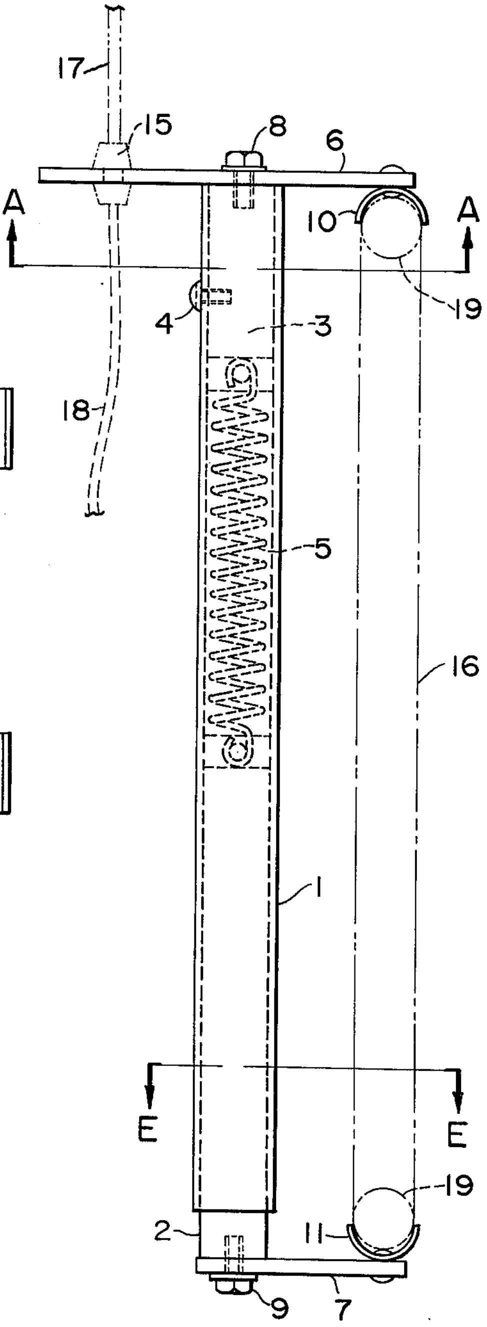

In describing the invention reference will be made to the attached drawings in which, FIG. 1, shows a side view of the invention attached to the bracket of the outside rear-view mirror.

Figure 2:
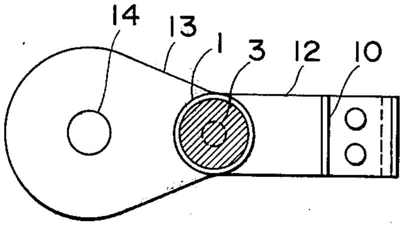
Figure 3:
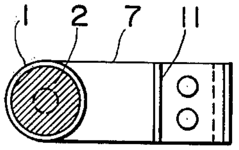

FIG. 2, shows a plan of one of the invention's components, Section A—A of FIG. 1, and FIG. 3, shows a plan of another of the invention's components, Section E—E of FIG. 1.

The outside rear-view mirror of a truck is usually supported by a "U" shaped bracket, the base of the "U" being straight and in an upright position, while the two arms of the "U" are in a horizontal position, with their ends attached to the truck. The invention which attaches to the horizontal arms 19,19, of the mirror bracket 16, consists mainly of a tube 1, which has a length slightly shorter than the distance between the arms 19,19. In the top of the tube 1 is inserted a short and round plug 3, flush with the upper edge of said tube. This plug is held fixed within the tube 1 by means of a set screw 4.

In the bottom of the tube 1 is inserted a round rod 2 which is free to slide in and out of said tube. The rod 2 is attached to the plug 3 by a spring 5 located within the tube 1 and in the space between the plug 3 and the rod 2.

Attached to the top of the plug 3, by means of a bolt 8, is an upper plate 6 which extend on both sides of the tube 1. One end of the plate 6 is provided with a downwardly pointing semicircular grip 10; the opposite end of the plate 6 is widened out into a circular shape 13 in which is centrally located a hole 14 in which is attached the antenna 17 by means of a standard holder 15. In between 13 and 10 is a narrow section plate 12.

Attached to the bottom of the rod 2, by means of a bolt 9, is a lower plate 7, to the end of which is attached an upwardly pointing semicircular grip 11. The grips 10 and 11 are in line with each other so that they can sandwhich between them the horizontal arms 19,19 and hold the antenna bracket tightly, due to the tension in the spring 5. The antenna wire 18 can be provided with a quick connection and disconnection by means of a plug cap and a cord connector.

From the above description it can be seen that the invention can be attached or removed easily and without the use of any type of tool, simply by stretching the distance between the grips 10 and 11 against the action of the spring 5.

Because of the frequent handling of this antenna bracket, it is preferably made of a light metal such as aluminum, however, it can be made of any metal using a welded construction, or it can be made of a suitable plastic material.

Having described the invention what I claim is:

1. A radio antenna bracket for attachment to the rear-view mirror of the cab of a truck or similar vehicle, comprising a longitudinal tube having a fixed plug in the upper end thereof; a sliding rod inserted in the bottom end thereof; a spring within the tube which joins the said sliding rod to the upper plug; a narrow horizontal upper plate attached to the top of the plug and extending a short distance on each side of said tube; a hole in one end of the upper plate for attaching an antenna thereto; a narrow plate, bent into a semicircle attached to the other end of said upper plate; a short, bottom plate, fixed to the bottom of the sliding rod, extending to one side only of said tube, and having at the end thereof attached a semicircular plate identical with the semicircular plate fixed to the upper plate, in line with it, and said semicircular plates toeing towards each other, so as to clamp between them by stretching the said spring, the bracket of said rear-view mirror.

* * * * *